United States Patent
Teo et al.

(10) Patent No.: US 11,637,692 B2
(45) Date of Patent: Apr. 25, 2023

(54) METHOD FOR ENROLLING NODES IN A COMMUNICATIONS NETWORK

(71) Applicant: The Procter & Gamble Company, Cincinnati, OH (US)

(72) Inventors: Michael Gan Teo, Cincinnati, OH (US); Doug Shean, Singapore (SG)

(73) Assignee: The Procter & Gamble Company, Cincinnati, OH (US)

( * ) Notice: Subject to any disclaimer, the term of this patent is extended or adjusted under 35 U.S.C. 154(b) by 752 days.

(21) Appl. No.: 16/249,926

(22) Filed: Jan. 17, 2019

(65) Prior Publication Data

US 2019/0319780 A1    Oct. 17, 2019

Related U.S. Application Data

(60) Provisional application No. 62/657,971, filed on Apr. 16, 2018.

(51) Int. Cl.
| | | |
|---|---|---|
| H04L 9/06 | (2006.01) | |
| H04L 9/30 | (2006.01) | |
| H04L 9/14 | (2006.01) | |
| H04L 9/08 | (2006.01) | |
| G06F 16/23 | (2019.01) | |
| H04L 9/00 | (2022.01) | |

(52) U.S. Cl.
CPC ........ *H04L 9/0637* (2013.01); *G06F 16/2379* (2019.01); *H04L 9/0819* (2013.01); *H04L 9/0866* (2013.01); *H04L 9/14* (2013.01); *H04L 9/30* (2013.01); *H04L 9/50* (2022.05)

(58) Field of Classification Search
CPC . H04L 9/0637; H04L 9/30; H04L 9/14; H04L 9/0866; H04L 9/0819; H04L 2209/38; H04L 2209/56; H04L 9/3239; G06F 16/2379

See application file for complete search history.

(56) References Cited

U.S. PATENT DOCUMENTS

| | | | | |
|---|---|---|---|---|
| 6,307,936 | B1 * | 10/2001 | Ober | G06F 21/82 |
| | | | | 380/46 |
| 2018/0316507 | A1 * | 11/2018 | Smith | H04L 9/0637 |
| 2019/0036913 | A1 * | 1/2019 | Tzur-David | G06F 21/42 |
| 2019/0036914 | A1 * | 1/2019 | Tzur-David | H04L 63/10 |
| 2019/0163912 | A1 * | 5/2019 | Kumar | H04L 9/3247 |
| 2019/0319808 | A1 * | 10/2019 | Fallah | H04L 9/3239 |

OTHER PUBLICATIONS

Won et al., 2018 IEEE Military Communication Conference (MILCOM), "Decentralized Public Key Infrastructure for Internet-of-Things", pp. 907-913 (Year: 2018).*

* cited by examiner

*Primary Examiner* — Khalil Naghdali
(74) *Attorney, Agent, or Firm* — Angela K. Haughey; Christian M. Best; David M. Weirich

(57) ABSTRACT

A method for enrolling a node in a network including steps of: providing a hub having a network communications element, established ownership, an owner, a private key and a public key; providing a first node having a network communications element, established ownership status, a network location status, a private key and a public key; scanning an environment to identify active hub devices; selecting a most likely hub device from among identified hub devices; receiving a hub public key from the selected hub; encrypting a string using the received public key; sending the encrypted string; receiving a decrypted copy of the string; validating the hub; sending an authentication request through the hub, the request including the public key of the first node; receiving an encrypted string; decrypting the string using the node's private key; sending the decrypted string through the hub; and updating the network location status of the node.

15 Claims, No Drawings

METHOD FOR ENROLLING NODES IN A COMMUNICATIONS NETWORK

FIELD OF THE INVENTION

The invention relates to methods for enrolling nodes in a network. The invention relates particularly to automatically enrolling nodes in an Internet of Things, ad hoc mesh network.

BACKGROUND OF THE INVENTION

The Internet of Thing (IoT) where devices interact by communicating over a network with or without user participation, is well known. Wired and wireless connections as well as numerous communication protocols may be used to facilitate the communications of devices as part of any particular portion of the IoT.

Establishing a connection to a device and identifying the owner of the device together with specifying the manner in which data from the device may be accessed and utilized may involve a number of different steps and may be daunting to a technically unsophisticated device owner. The necessity of identifying the device, the network, the user, the nature of the connection as well as the function the device will serve within the IoT environment each add complexity and reduce the likelihood of widespread adoption of device use.

What is needed is a simplified method for enrolling devices in an IoT environment where the ownership and usage settings of the device may be easily accomplished with high levels of security as well as automation.

SUMMARY OF THE INVENTION

A method for enrolling a node in a network including steps of: providing a hub having a network communications element, established ownership, an owner, a private key and a public key; providing a first node having a network communications element, established ownership status, a network location status, a private key and a public key; scanning an environment to identify active hub devices; selecting a most likely hub device from among identified hub devices; receiving a hub public key from the selected hub; encrypting a string using the received public key; sending the encrypted string; receiving a decrypted copy of the string; validating the hub; sending an authentication request through the hub, the request including the public key of the first node; receiving an encrypted string; decrypting the string using the node's private key; sending the decrypted string through the hub; and updating the network location status of the node.

DETAILED DESCRIPTION OF THE INVENTION

In one embodiment, a method for enrolling devices in a network includes: providing a device comprising a network communications element and communication software. The network communications element may comprise hardware and software for 802.11 (WiFi), 802.15.4, (Zigbee, Thread etc.) a BLUETOOTH®, Bluetooth Mesh protocol, LoRa®, SigFox®, BLUETOOTH® LE, Zigbee® Cellular, or other known network communications devices and associated software. (most of these are brands not technologies, so I added technology)

The devices may further comprise software configured to accomplish various steps of the method. Client software may be included to enable the functions associated with the blockchain connection as well as the interactions with the blockchain ledger entries and smart contract generation. The devices may further comprise communications software to enable network interactions.

In one embodiment, the devices may comprise software, which when executed will cause the device to search its environment for active networks. The device may be provisioned with sufficient information such that the device may seek a particular address or location over the network to initiate a change in the ownership or recorded location of the device. In this embodiment, simply providing the device with power is sufficient to trigger the searching, addressing and initiation of the conversation between the device and other network resources to enable the assignment of the device to a new owner or to enable a change in the recorded location of the device as set forth below. The search of the environment may result in finding a local area network available by WiFi with access to the internet via the router. Alternatively, device may be configured to utilize LoRa, SystemFox, Whispernet or other network infrastructures to access the network resources.

A private blockchain may be created to serve as the backbone of the system of the method. The blockchain may be used to provide a secure location for authenticating users and devices as well as providing storage for smart contracts associated with the use of the devices. Exemplary software platforms for the creation an ongoing use of the private blockchain include Ethereum®, Hyperledger®, Stellar® and others known in the art.

The devices may concurrently function in two modes, a gateway mode and a node mode. In the gateway mode, the devices act as a hub and provide access to the blockchain for other devices in the system. In this mode only the hub device needs to have an internet connect, the other nodes then utilize the hub's connection to access the blockchain. In the gateway mode, the hub device makes requests and interacts with the blockchain on behalf of the node devices.

In the node mode, the devices may see and interact with other nodes and gateway devices in the local portion of the network.

Using the blockchain backbone, a ledger entry may be created for each device intended for IoT use. The ledger entry may include a public and private key generated for the device as well as an initial status of unclaimed representing the ownership of the device and an address for the device. In one embodiment, the public and private keys for each device may be generated by selecting a private key within a defined numerical range, $1\text{-}2^{256}\text{-}1$, for example, then providing a 256-bit description of the selected private key, generating the public key from the 256-bit private key using an Elliptic Curve Digital Signature Algorithm. An address associated with the public/private key combination may then be derived from the public key by applying a hashing algorithm, such as SHA-256, or Keccak-256 hashing algorithms to the public key and selecting the rightmost 40 characters of the result as the address. Additional characters may be added to the truncated hash value as an additional step of the process.

A user may initiate utilization of the system of the method by establishing an account within the system. The user may access the system via a network such as the internet. The user may download a software application to a personal computer, tablet device or smart phone to enable access to the system. Utilizing the software, the user may link to the system administration element and establish an account by providing relevant information such as their identity and location details.

A ledger entry may be generated in association with the user's now established account to provide the user an addressable location in the blockchain ledger. The public key, private key and address for the user may be generated in a manner similar to that described above for the device ledger entry.

The devices may be offered to the user through retail channels or other known distribution channels. Each device may be provided with a copy of the private key of the particular device at the point of sale.

In one embodiment, the user may provide information sufficient to associate themselves with their account to the seller at the point of sale. The seller or point of sale device may then connect to the ledger over a network and provide information specific to the particular device such that the ledger entry for the purchased device may be updated to reflect a change of ownership of the device to the user's account. In this embodiment, the device will already be associated with the user's account when it is turned on after purchase for the first time. The user may provide a user name, account number public key or other information associated with their account at the point of sale to facilitate this transaction.

The user may connect the acquired device to a network enabling communications between the device and the system blockchain. The device software may be configured to seek the blockchain once connected to a network and to subsequently initiate a connection request with the blockchain. The connection request may include the public key of the device.

After connecting the device to the network, the user may initiate a claiming request from their connected interface (computer, tablet, phone). The claiming request may comprise the public key of the user as well as the provided private key of the device. The system receives the claiming request, looks up the user using the provided public key, seeks the device using the provided private key and determines the ownership status of the device. An unclaimed device is then given a new ownership status associated with the user in a ledger entry comprising the keys and address of the device as well as the public key of the user.

In one embodiment, the validity of the user in the above process may be challenged. In this embodiment, the system may send a string encrypted using the public key of the user. The user's device may then decrypt the string using the private key of the user and send the decrypted string to the system. The system may then compare the received decrypted string with the original string. A match of the two strings results in validation of the user.

In one embodiment, the method for enrolling devices in a network includes providing a hub device having a public and private key and an owner. In this embodiment, the hub device may comprise any IoT node device of the system which has previously been successfully claimed by a user/owner. The ledger entry of the hub device updated to reflect the ownership status. An active node of the system may utilize the network communications element to broadcast the public key of the node.

Subsequent to claiming the first device, a user may acquire a second IoT device together with the private key of the second device. The user may connect the device to the network, in some instances simply by providing power to the device or by turning the device on and providing power to the network communications element of the device.

The initial node, now acting as a hub device, broadcasts its public key. The new node device receives the public key of the hub device, encrypts and sends a string using the hub public key over the network. The hub device receives the encrypted string, decrypts it using the hub's private key and sends the decrypted string over the network. The new node receives the decrypted string and compares it to the original string. When the strings match, the node device initiates a pairing request to attach itself to the owner of the hub in terms of ownership of the node.

In one embodiment, the new node may scan the environment seeking hub devices. When only a single hub device is found the method proceeds as described above. For environments having multiple nodes owned by different user, the new node must make a decision as to which node/hub device to contact as described.

In this embodiment, the new node may select a hub most likely to belong to the use. The new node may take into consideration the distance, determined using time of flight analysis and pinging signals sent to the respective hubs, the relative signal strengths of the signals received from the respective hub devices and the latency in response time to signals sent to the hub devices. Once a most likely hub is identified, the new node may proceed to validate the hub as described above.

The now-validated hub may subsequently seek to validate the new node. The hub may receive a request from the node for pairing. The request may comprise the public key of the node. The hub may encrypt a string using the node's public key and send the encrypted string over the network. The node may receive the encrypted string, decrypt it using the private key of the node and send the decrypted string over the network. The hub may receive the decrypted string and compare it to the original string. The hub validates the node when the strings match.

Once the hub has validated the node, the hub may then send a request to the blockchain to update the ledger entry of the new node to reflect a change in the ownership of the new node to the owner of the hub. The system may also send a notice to the owner of the hub and new node that the new node has been added to their user ownership profile. The notice may be originated by the new node, the hub or the system administration element.

Once a node has been validated and paired, the node may then be sent a data address associated with the user/owner of the node. The node may then send node data associated with the IoT functionality of the node to the data storage address. The user may interact with the system using the application software to specify the access and use setting associated with the node data. In one embodiment, the user may specify that the node data is private and may only be accessed by the user. In one embodiment, the user may specify that other parties may access the node data. The node data access settings may be stored in the blockchain as a smart contract associated with the user and the particular node. The user may set time limits on the access of the node data by other parties. The access limits may be embodied in, and enforced by smart contracts in the blockchain entries.

In one embodiment, a service provider may own and provide the IoT devices to users. The users may then purchase time-based access to the device using the application software. Smart contracts in the blockchain may then be used to track and enforce access to the devices by the users.

In one embodiment, a hub owned by a first user may function as a gateway for one or more nodes owned by a second user. In this embodiment, the previously claimed node may interact with the hub owned by another user such that each of the hub and the node are validated. The hub may then send a request to the blockchain regarding the new location of the node and establishing a connection between the node and the blockchain. The system may respond with a listing of nodes having common ownership with the newly connected node. The status of the hub may also be updated to reflect its service as a gateway for the particular node.

In this embodiment, the node owned by the first user may interact with the ledger via the hub owned by a second user. The interaction may enable the node to provide information for use by the first user without exposing this information to the second user. Similarly, though the node utilizes the hub owned by the second user, neither the node, nor the first user are afforded access to any information provided by the hub itself or any nodes owned by the second user which may also be interacting with the ledger via the hub owned by the second user.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method comprising:
generating, by a system device, a first public key and a first private key for a first user device;
creating, by the system device, a first ledger entry for the first user device in a distributed ledger, wherein the first ledger entry comprises a device owner parameter that is set to first value indicating the first user device is unclaimed, the first public key, and the first private key;
receiving, by the system device via a network, from a point of sale device via a network, user information representative of a user that has acquired the first user device;
generating, by the system device, a second public key and a second private key for the user information;
creating, by the system device, a second ledger entry in the distributed ledger comprising the user information, the second public key, and the second private key;
providing, by the system device to a second user device associated with the user via the network, the first private key of the first user device; and
updating, by the system device, the first ledger entry to change the device owner parameter to a second value indicating that the user is an owner of the first user device.

2. The method of claim 1, further comprising receiving, by the system device, a connection request from the first user device.

3. The method of claim 1, further comprising receiving, by the system device, a claiming request from the second user device, the claiming request comprising the second public key and the first private key.

4. The method of claim 1, further comprising:
sending, by the system device, to the second user device via the network, an encrypted validation request that is encrypted from a validation request using the second public key;
receiving, by the system device, from the second user device via the network, a decrypted validation request decrypted from the encrypted validation request;
comparing, by the system device, the decrypted validation request and the validation request; and
in response to determining that the decrypted validation request and the validation request match, validating, by the system device, the second user device.

5. A method, the method comprising:
broadcasting, by a hub device via a first network, a first public key assigned to the hub device;
receiving, by the hub device, from a user device via the first network, an encrypted request encrypted from a request using the first public key;
decrypting, by the hub device, the encrypted request using a first private key provided to the hub device to obtain the request;
sending, by the hub device, to the user device via the first network, the request; and
receiving, by the hub device, from the user device via the first network, a confirmation that the user device seeks to pair with the hub device.

6. The method of claim 5, wherein the receiving the confirmation comprises:
receiving, by the hub device, from the user device via the first network, a pairing request to pair the user device with the hub device, the paring request comprising a second public key assigned to the user device;
encrypting, by the hub device, a validation request using the second public key to generate an encrypted validation request;
sending, by the hub device, to the user device via the first network, the encrypted validation request;
receiving, by the hub device, from the user device via the first network, a decrypted validation request that is decrypted from the encrypted validation request;
comparing the decrypted validation request and the validation request; and
in response to determining that the decrypted validation request and the validation request match, sending, by the hub device, to a system device via a second network, an update request to update a ledger entry associated with the user device in a distributed ledger to change an owner parameter in the ledger entry to indicate that the user device is owned by an owner that also owns the hub device.

7. The method of claim 5, further comprising the step of:
sending, by the hub device, a notice to the owner of the hub device that the user device has been added to the first network.

8. A method comprising:

scanning, by a user device, an environment to identify hub devices that are active, wherein the user device is owned by an owner, and the user device is assigned a first public key and a first private key;

determining, by the user device, a hub device that is most likely to also be owned by the owner from the hub devices;

receiving, by the user device, a second public key from the hub device;

encrypting, by the user device, a first string using the second public key to generate an encrypted first string;

sending, by the user device, to the hub device via a network, the encrypted first string;

receiving, by the user device, from the hub device via the network, a decrypted first string decrypted from the encrypted first string;

in response to determining that the decrypted first string and the first string match, validating, by the user device, the hub;

sending, by the user device, to the hub device via the network, a pairing request including the first public key;

receiving, by the user device, from the hub device via the network, an encrypted second string;

decrypting, by the user device, the encrypted second string using the first private key to generate a decrypted second string;

sending, by the user device, to the hub device via the network, the decrypted second string; and receiving, by the user device, from the hub device via the network, a confirmation of pairing of the hub device to the user device.

9. The method of claim 8, further comprising:

sending, by the user device via the network, a notice of ownership status of the user device to the owner.

10. The method of claim 8, further comprising:

receiving, by the user device, from the hub device via the network, a data storage address; and sending, by the user device via the network, node data to the data storage address.

11. The method of claim 8, further comprising:

accessing, by the user device via the network, an account associated with the owner; and configuring, by the user device via the network, a data access setting in the account for the node data.

12. A method comprising:

scanning, by an Internet of Thing device, an environment to identify hub devices that are active, wherein the user device is owned by an owner, and the user device is assigned a first public key and a first private key;

determining, by the Internet of Thing device, a hub device that is most likely to also be owned by the owner from the hub devices;

receiving, by the Internet of Thing device, a second public key from the hub device;

encrypting, by the Internet of Thing device, a first string using the second public key to generate an encrypted first string;

sending, by the Internet of Thing device, to the hub device via a network, the encrypted first string;

receiving, by the Internet of Thing device, from the hub device via the network, a decrypted first string decrypted from the encrypted first string;

in response to determining that the decrypted first string and the first string match, validating, by the Internet of Thing device, the hub;

sending, by the Internet of Thing device, to the hub device via the network, an authentication request including the first public key of the Internet of Thing device;

receiving, by the Internet of Thing device, from the hub device via the network, an encrypted second string;

decrypting, by the Internet of Thing device, the encrypted second string using the first private key to generate a decrypted second string;

sending, by the Internet of Thing device, to the hub device via the network, the decrypted second string; and updating, by the Internet of Thing device, a network location status of the Internet of Thing device.

13. The method of claim 12, further comprising:

updating, by the hub device, a gateway status of the hub device for the Internet of Thing device.

14. The method of claim 12, further comprising:

receiving, by the hub device, a listing of nodes having common ownership with the Internet of Thing device.

15. A method comprising:

generating, by a system device, a first public key and a first private key for a first user device;

creating, by the system device, a first ledger entry for the first user device in a distributed ledger, wherein the first ledger entry comprises a device owner parameter that is set to first value indicating the first user device is unclaimed, the first public key, and the first private key;

generating, by the system device, a second public key and a second private key for a user account;

creating, by the system device, a second ledger entry in the distributed ledger comprising an identifier of the user account, the second public key, and the second private key; and updating, by the system device based upon provision of the first private key for the user account, the first ledger entry to change the device owner parameter to a second value indicating that the user account is of an owner of the first user device.

* * * * *